(12) United States Patent
Tominaga

(10) Patent No.: US 6,434,341 B1
(45) Date of Patent: Aug. 13, 2002

(54) ORIENTATION REGULARIZING APPARATUS AND SORTING APPARATUS FOR LENS-FITTED PHOTO FILM UNIT

(75) Inventor: Yoshihiro Tominaga, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/436,706

(22) Filed: Nov. 9, 1999

(30) Foreign Application Priority Data

Nov. 10, 1998 (JP) .......................................... 10-318590
Nov. 10, 1998 (JP) .......................................... 10-318591

(51) Int. Cl.[7] ............................................. G03B 17/48
(52) U.S. Cl. ........................... 396/429; 396/6; 198/396
(58) Field of Search .......................... 396/6, 429, 535; 209/557, 556; 198/396

(56) References Cited

U.S. PATENT DOCUMENTS

| | | | |
|---|---|---|---|
| 4,863,037 A | * 9/1989 | Stevens et al. | 53/381.3 |
| 5,244,100 A | * 9/1993 | Regier et al. | 209/556 |
| 5,427,224 A | * 6/1995 | Suehara et al. | 198/396 |
| 5,615,395 A | 3/1997 | Komaki et al. | 396/6 |
| 5,675,671 A | * 10/1997 | Hayduchok et al. | 382/296 |

FOREIGN PATENT DOCUMENTS

| | | | |
|---|---|---|---|
| JP | 63-139231 | 9/1988 | ........... B65G/47/91 |
| JP | 6-286853 | 10/1994 | ........... B65G/47/24 |
| JP | 08-282837 | * 10/1996 | ........... B65G/47/68 |
| JP | 8-282837 | 10/1996 | ........... B65G/47/68 |
| JP | 9-169425 | 6/1997 | ........... B65G/47/08 |
| JP | 09-169425 | * 6/1997 | ........... B65G/47/08 |

* cited by examiner

Primary Examiner—Russell Adams
Assistant Examiner—Arthur A Smith
(74) Attorney, Agent, or Firm—Sughrue Mion, PLLC

(57) ABSTRACT

An orientation regularizing apparatus for a lens-fitted photo film unit aligns the unit in one line in a conveying direction. The unit is conveyed in an erect position in one of four orientations. The apparatus discriminates the particular unit's orientation. The unit is guided to one of four conveying paths that correspond to the four orientations. In the second path, the unit is turned over to exchange the front and rear surfaces with one another, placing the unit regularly in a first orientation. In the third path, the unit is turned over to exchange the top and bottom surfaces with one another and to exchange the front and rear surfaces with one another, setting the unit regularly in the first orientation. In the fourth path, the unit is turned over to exchange the top and bottom surfaces with one another, setting the unit regularly in the first orientation.

21 Claims, 11 Drawing Sheets

ORIENTATION REGULARIZING APPARATUS AND SORTING APPARATUS FOR LENS-FITTED PHOTO FILM UNIT

BACKGROUND OF THE INVENTION

1. Field of the Invention

The present invention relates to an orientation regularizing apparatus and a sorting apparatus for a lens-fitted photo film unit. More particularly, the present invention relates to an orientation regularizing apparatus and a sorting apparatus in which a lens-fitted photo film unit can be treated efficiently for the purpose of recycling.

2. Description Related to the Prior Art

Today, industrial products are recycled for the purposes of protection of the environment and reduction of industrial wastes. There are two types of recycling, which include regeneration of raw material of disassembled parts which are mainly plastic, and reuse of disassembled parts in an original form. U.S. Pat. No. 5,615,395 (corresponding to JP-A 6-161042) discloses recycling of a lens-fitted photo film unit. After removal of exposed photo film, the lens-fitted photo film units are withdrawn. A recycling line disassembles the lens-fitted photo film units into parts. An exposure unit, a flash unit and the like are reused. In turn a front cover and a rear cover are subjected to regeneration of material.

The lens-fitted photo film units have a shape of nearly a rectangular parallelepiped, but are different between various types in the size, projecting and retracted patterns of the surface, positions of a shutter release button or a photo film winder wheel, or the like. As the recycling line is installed for each of the types of the lens-fitted photo film units, the lens-fitted photo film units must be sorted into types before supply for the recycling line. Also, the lens-fitted photo film units should be oriented with its taking lens directed upward in the recycling line in the course of recycling operation. Thus the orientation of the lens-fitted photo film units should be regularized before the supply for the recycling line.

U.S. Pat. No. 5,427,224 (corresponding to JP-A 6-156688) discloses an aligning apparatus, which is constituted by a V-shaped conveyor, a cylindrically shaped rotatable drum and a top-to-bottom turning mechanism. The V-shaped conveyor is supplied with the lens-fitted photo film units in random orientations, and conveys them toward the drum. The drum is provided with a helically shaped guiding structure disposed on the inside. Rotation of the guiding structure causes the lens-fitted photo film units to come to be conveyed in its longitudinal direction. So the lens-fitted photo film units become oriented in a top-upward or bottom-upward orientation. The top-to-bottom turning mechanism consists of a dropping device and first and second conveyors. The second conveyor is disposed under the first in parallel. The first conveyor is supplied with the lens-fitted photo film units in the top-upward or bottom-upward orientation. The dropping device, of which an example is an air blow device, moves the lens-fitted photo film units from the first conveyor in a direction perpendicular to the conveying direction. The lens-fitted photo film units are turned upside down and caused to drop on the second conveyor.

However the aligning apparatus according to the above document has a shortcoming in that it cannot regularize the lens-fitted photo film units in a predetermined one of a front-forward orientation in which a front wall of the lens-fitted photo film units is directed forward, and a rear-forward orientation in which a rear wall of the lens-fitted photo film units is directed forward. It is noted that JP-U 63-139231 and JP-A 6-286853 discloses a turning device for changing a direction of a workpiece in reverse to the conveying direction. The turning device makes it possible to regularize the lens-fitted photo film units in a predetermined one of the front-forward and rear-forward orientations. However there arise considerable problems if the turning device of those documents is combined with the aligning apparatus. The turning device must be disposed either in front of or behind the aligning apparatus, to increase the total length of the line. A space for installing the aligning apparatus becomes too large and unsuitable to be used. Also, the number of processes in operation of the line is too large in an unwanted manner.

JP-A 8-282837 discloses a sorting apparatus, which is constituted by a conveyor belt, two direction changing plates and plural paths. The direction changing plates and the paths are disposed in the conveying direction of the conveyor belt. The lens-fitted photo film units are so oriented erectly that its longitudinal direction is set in the conveying direction. When the lens-fitted photo film units are passed between the direction changing plates, the direction changing plates are rotated at a predetermined angle. The direction of the lens-fitted photo film units is changed to introduce the lens-fitted photo film units into a designated one of the plural paths.

In the above document, the direction changing plates change the direction of the lens-fitted photo film units while the lens-fitted photo film units are oriented erect on the conveyor belt. It is very likely that the lens-fitted photo film units fall down between the direction changing plates. Also the width of the conveyor belt is fixed to limit the number of the paths. The sorting apparatus of the prior art is unsuitable for sorting of a considerable number of types.

SUMMARY OF THE INVENTION

In view of the foregoing problems, an object of the present invention is to provide an orientation regularizing apparatus for a lens-fitted photo film unit in which the number of processes in operation of the apparatus is prevented from being too great, and a size of the apparatus is prevented from being too large.

Another object of the present invention is to provide a sorting apparatus for a lens-fitted photo film unit in which accidents in operation are reduced, and the number of types to be sorted can be easily increased.

In order to achieve the above and other objects and advantages of this invention, an orientation regularizing apparatus, for a lens-fitted photo film unit having front, rear, top and bottom surfaces, is provided. A supplier supplies the lens-fitted photo film unit aligned in one line in a conveying direction, the lens-fitted photo film unit having one of first, second, third and fourth orientations while conveyed, the second orientation having the front and rear surfaces replaced with one another with reference to the first orientation, the third orientation having the front and rear surfaces replaced with one another and the top and bottom surfaces replaced with one another with reference to the first orientation, and the fourth orientation having the top and bottom surfaces replaced with one another with reference to the first orientation. First, second, third and fourth conveying paths are supplied with the lens-fitted photo film unit by the supplier. An orientation discriminator discriminates which the lens-fitted photo film unit from the supplier has of the first to fourth orientations. A sorter is operated according to a discrimination result from the orientation discriminator, for guiding the lens-fitted photo film unit to the first to fourth conveying paths when the lens-fitted photo film unit has respectively the first to fourth orientations. A first front-to-rear turning unit is disposed in the second conveying path, for turning over the lens-fitted photo film unit to replace the front and rear surfaces with one another, so as to set the lens-fitted photo film unit regularly in the first orientation. A first top-to-bottom turning unit is disposed in the third conveying path, for turning over the lens-fitted photo film unit to replace the top and bottom surfaces with one another and to replace the front and rear surfaces with one another, so as to set the lens-fitted photo film unit regularly in the first orientation. A second front-to-rear turning unit is disposed in the fourth conveying path, for turning over the lens-fitted photo film unit to replace the front and rear surfaces with one another. A second top-to-bottom turning unit is disposed in the fourth conveying path, for turning over the lens-fitted photo film unit to replace the top and bottom surfaces with one another and to replace the front and rear surfaces with one another, so as to set the lens-fitted photo film unit regularly in the first orientation.

In the present invention, the first and second front-to-rear turning units and the first and second top-to-bottom turning units are combined sufficiently simply in effective operation of regularizing the orientation of the lens-fitted photo film unit. By this construction, the number of processes in operation of the apparatus is prevented from being too great. A size of the apparatus is prevented from being too large.

In a preferred embodiment, the conveying direction is a longitudinal direction of the lens-fitted photo film unit.

Furthermore, an aligning mechanism aligns the lens-fitted photo film unit from the first to fourth conveying paths in one line with the first orientation kept.

The orientation regularizing apparatus operates for the lens-fitted photo film unit after photo film removal, and the lens-fitted photo film unit is supplied to a recycling line therefor after setting in the first orientation.

When the lens-fitted photo film unit is in the first and second orientations, the top surface is directed upwards.

The orientation discriminator includes a light source for applying inspecting light to the lens-fitted photo film unit. A pick-up unit picks up the inspecting light reflected by the lens-fitted photo film unit. A determining unit determines one of the first to fourth orientations in accordance with the inspecting light picked up.

The first or second front-to-rear turning unit includes a rotary guiding mechanism, disposed in the second or fourth conveying path, rotatable about a vertically extending rotational axis, having first and second opposed portions, the first and second opposed portions being arranged horizontally and opposed to one another, for receiving insertion of the lens-fitted photo film unit therebetween in conveyance. A position sensor detects a reach of the lens-fitted photo film unit to the rotary guiding mechanism. A controller is responsive to an output from the position sensor, for causing the rotary guiding mechanism to make half a rotation.

Furthermore, a conveyor conveys the lens-fitted photo film unit along the second or fourth conveying path. A stopper is disposed in the second or fourth conveying path and upstream from the rotary guiding mechanism, for blocking the lens-fitted photo film unit in the second or fourth conveying path. The controller operates in turning and conveying steps alternately, and when in the turning step, causes the stopper to block lens-fitted photo film units succeeding to a first one of plural lens-fitted photo film units arranged in the conveying direction, and causes the rotary guiding mechanism to turn the first lens-fitted photo film unit, and when in the conveying step, causes the conveyor to convey the first lens-fitted photo film unit out of the rotary guiding mechanism, and shifts the stopper out of the second or fourth conveying path to supply the rotary guiding mechanism with one of the lens-fitted photo film units succeeding to the first lens-fitted photo film unit.

The first or second top-to-bottom turning unit includes a dropping section for dropping the lens-fitted photo film unit from a predetermined position by shifting the lens-fitted photo film unit in a direction crosswise to the conveying direction during conveyance. A receiving section is disposed under the predetermined position, for receiving the lens-fitted photo film unit dropped and oriented upside down.

The dropping section includes a carrier roller disposed upstream from the predetermined position and oriented substantially horizontally. A return roller is disposed downstream from the predetermined position and oriented erectly with reference to the carrier roller. A twisted conveyor belt is supported and driven by the carrier roller and the return roller and twisted with reference to the conveying direction.

Furthermore, a sorting device sorts the lens-fitted photo film unit from the first to fourth conveying paths.

According to one aspect of the present invention, a sorting apparatus for a lens-fitted photo film unit includes a type discriminator for detecting a type of the lens-fitted photo film unit. A conveyor serially conveys the lens-fitted photo film unit from the type discriminator along a sorting conveying path. A position detector detects a position of the lens-fitted photo film unit along the sorting conveying path. N ejecting paths are arranged on one side of the sorting conveying path, extended crosswise to the sorting conveying path, and associated with respectively predetermined types. N pushers are disposed on an opposite side to the N ejecting paths with respect to the sorting conveying path, and movable toward respectively the N ejecting paths. A controller is responsive to outputs from the type discriminator and the position detector, for controlling the N pushers, the controller designating a Kth one of the N pushers in accordance with the detected type, and driving the Kth pusher when the lens-fitted photo film unit moves to a position of the Kth pusher, so as to push the lens-fitted photo film unit from the sorting conveying path to the Kth ejecting path.

In the present invention, the plural ejecting paths and the plural pushers are disposed in combination with the sorting conveying path. By this construction, the number of types to be sorted can be easily increased. Accidents in operation are reduced.

In a preferred embodiment, the conveyor conveys the lens-fitted photo film unit in a longitudinal direction thereof along the sorting conveying path.

The lens-fitted photo film unit includes a taking lens. Furthermore, an orientation regularizer is disposed upstream from the type discriminator, for orienting the lens-fitted photo film unit with the taking lens directed upwards.

The type discriminator includes a light source for applying inspecting light to the lens-fitted photo film unit. A pick-up unit picks up the inspecting light reflected by the lens-fitted photo film unit. The controller determines one of the types in accordance with the inspecting light picked up.

The sorting apparatus operates for the lens-fitted photo film unit after photo film removal, and the lens-fitted photo film unit is supplied to a recycling line therefor after being pushed to the N ejecting paths.

The position detector includes N sensors, disposed along the sorting conveying path in association with respectively the N pushers, for detecting the lens-fitted photo film unit.

In another preferred embodiment, the position detector includes a length measuring unit for measuring a conveyed distance at which the conveyor conveys the lens-fitted photo film unit along the sorting conveying path. The controller stores N reference distances predetermined for respectively the N pushers along the sorting conveying path, and when the conveyed distance comes up to a Kth one of the N reference distances, detects that the lens-fitted photo film unit is located in the position of the Kth pusher.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Lens-fitted photo film units, after removal of exposed photo films in photo laboratories, are withdrawn to a factory in a state contained in containers or trays having lateral walls and in a collective manner at a predetermined amount. The lens-fitted photo film units are supplied to a sorting line, aligned in one orientation and sorted into types. Then the lens-fitted photo film units are transferred to recycling lines installed for the respective types.

The sorting line includes an aligning unit, an orientation regularizer, an orientation setter mechanism and a sorter which are arranged in series. Lens-fitted photo film units conveyed in random orientations are set in one common orientation and sorted into types. The lens-fitted photo film units have a shape of a substantially rectangular parallelepiped. A length, width and thickness of the shape are different between the types.

Figure 1:
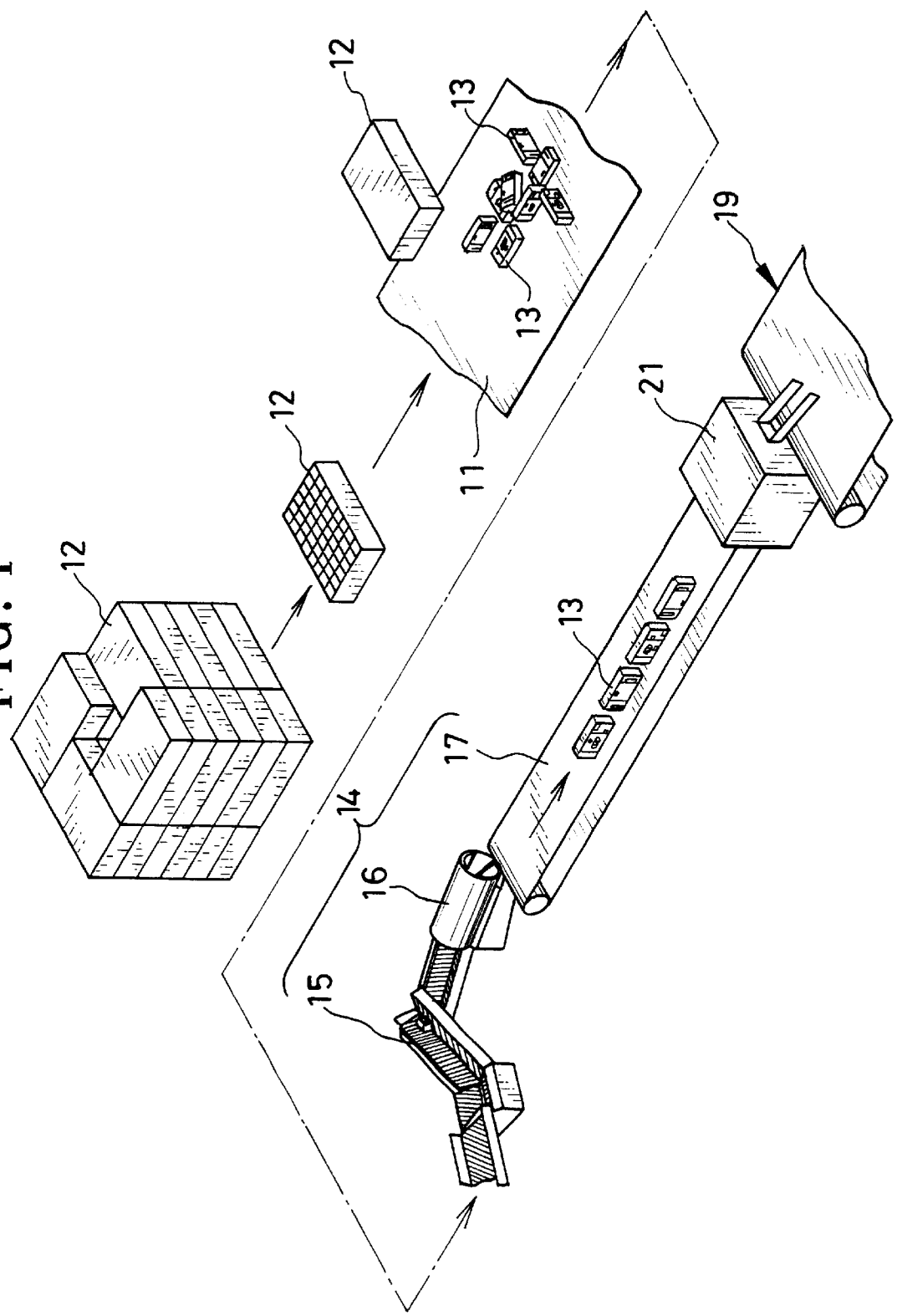
FIG. 1 is an explanatory view in perspective, illustrating an aligning unit in a sorting line for lens-fitted photo film units.

In FIG. 1, a conveyor 11 of the sorting line is depicted. A plurality of lens-fitted photo film units 13 being used are taken out of a tray 12, supplied to the conveyor 11 in random orientations, and conveyed to an aligning unit 14 at a supplier. Details of a structure of the aligning unit 14 are disclosed in U.S. Pat. No. 5,427,224 (corresponding to JP-A 6-156688), according to which the aligning unit 14 is constituted by a V-shaped conveyor 15 and a rotatable drum 16.

The V-shaped conveyor 15 receives the lens-fitted photo film units 13 conveyed in random orientations, aligns them in one line, and conveys them toward the drum 16. A helically shaped guiding structure is disposed on the inside of the drum 16, of which rotation causes the lens-fitted photo film units 13 to come to move in its longitudinal direction.

The lens-fitted photo film units 13 are advanced from the drum 16 by a conveyor belt 17, and are so oriented that their longitudinal direction is set in a conveying direction of the drum 16. There are four possible orientations of the lens-fitted photo film units 13, including a front-forward/top-upward orientation, a front-forward/bottom-upward orientation, a rear-forward/top-upward orientation, and a rear-forward/bottom-upward orientation. If a front wall of one of the lens-fitted photo film units 13 is located on a predetermined front side, then its front is oriented forwards. If a rear wall of one of the lens-fitted photo film units 13 is located on the predetermined front side, then its rear is oriented forwards. If a viewfinder of one of the lens-fitted photo film units 13 is located higher, then its top is oriented upwards. If the viewfinder of one of the lens-fitted photo film units 13 is located lower, then its top is oriented downwards.

Figure 2A:
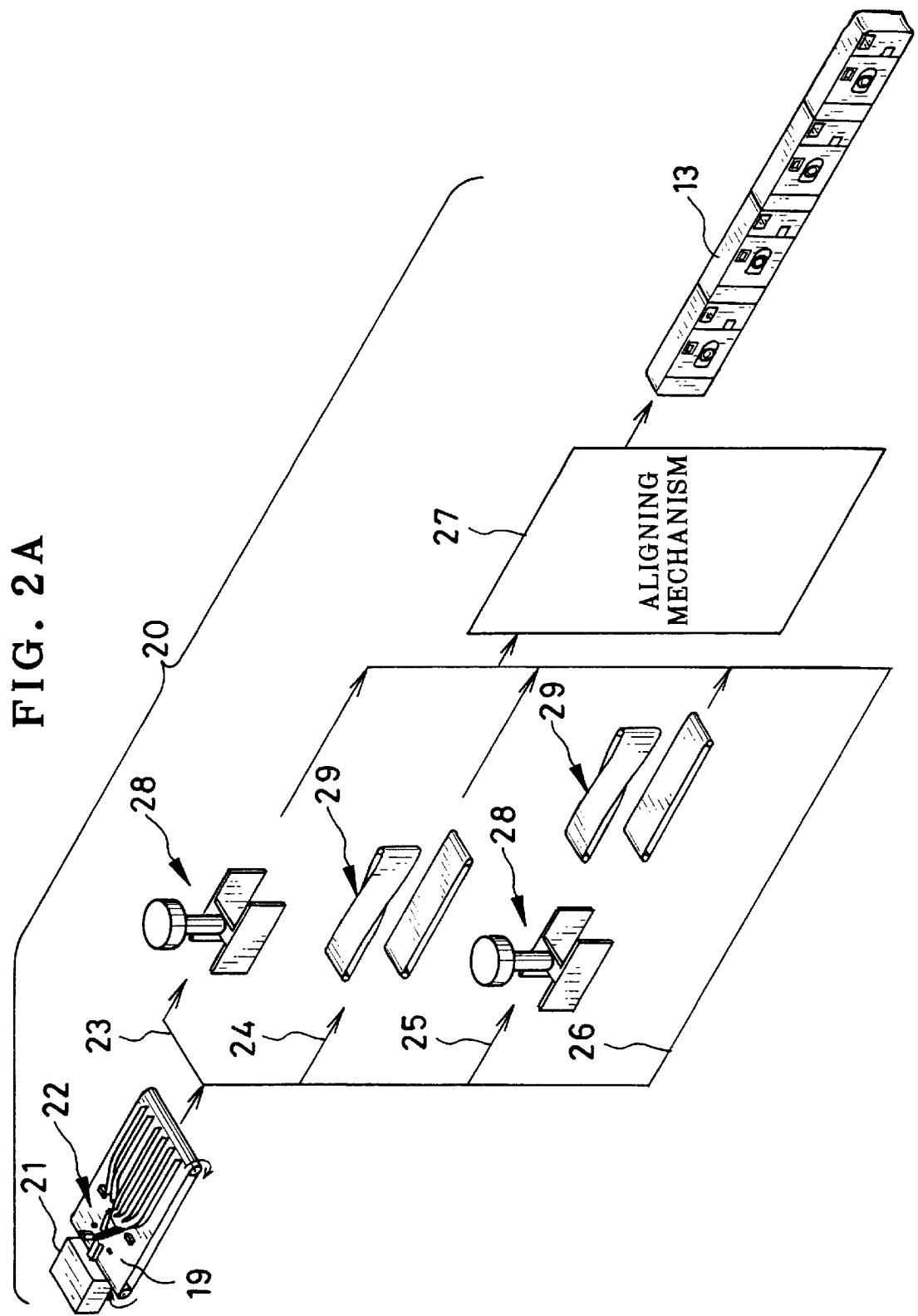
FIG. 2A is an explanatory view in perspective, illustrating an orientation regularizer in the sorting line.
Figure 3B:
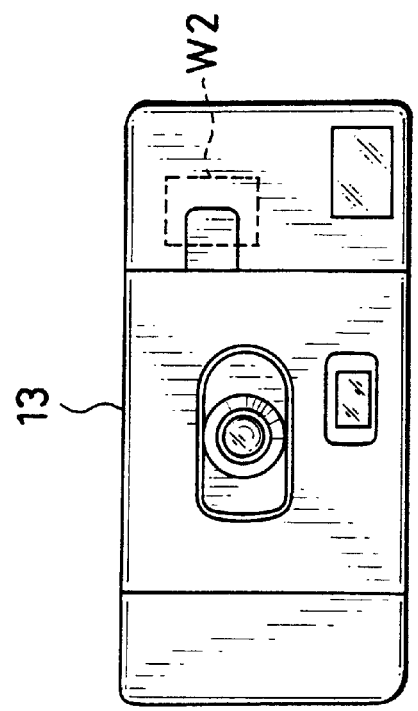
FIG. 3B is a front elevation illustrating a front-forward/bottom-upward orientation.
Figure 3D:
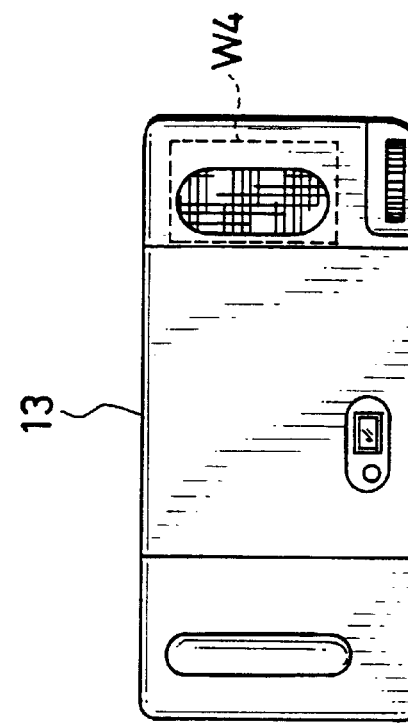
FIG. 3D is a rear elevation illustrating a rear-forward/bottom-upward orientation.
Figure 3A:
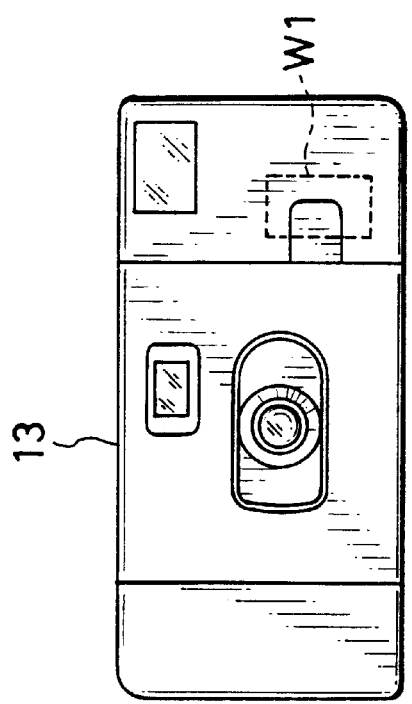
FIG. 3A is a front elevation illustrating a front-forward/top-upward orientation of each lens-fitted photo film unit.
Figure 3C:
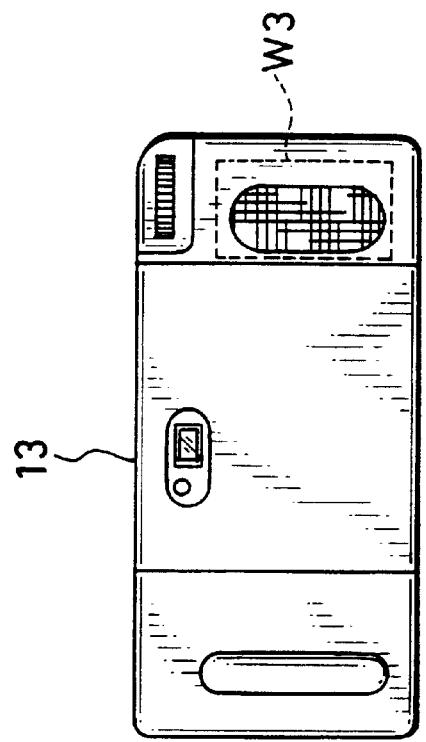
FIG. 3C is a rear elevation illustrating a rear-forward/top-upward orientation.

In FIG. 2A, an orientation regularizer 20 is constituted by an orientation discriminator 21, a sorter 22 or selective guiding mechanism, four conveying paths 23–26 and an aligning mechanism 27. The four conveying paths 23–26 are a first conveying path 26, a second conveying path 23, a third conveying path 24 and a fourth conveying path 25. An example of the orientation discriminator 21 is disclosed in JP-A 8-282837. The orientation discriminator 21 picks up an image of the lens-fitted photo film unit 13 in a direction perpendicular to the conveying direction to detect one of four orientations of FIGS. 3A–3D. According to information of the orientation, the sorter 22 is controlled. FIG. 3A illustrates the front-forward/top-upward orientation. FIG. 3B illustrates the front-forward/bottom-upward orientation. FIG. 3C illustrates the rear-forward/top-upward orientation. FIG. 3D illustrates the rear-forward /bottom-upward orientation.

Figure 2B:
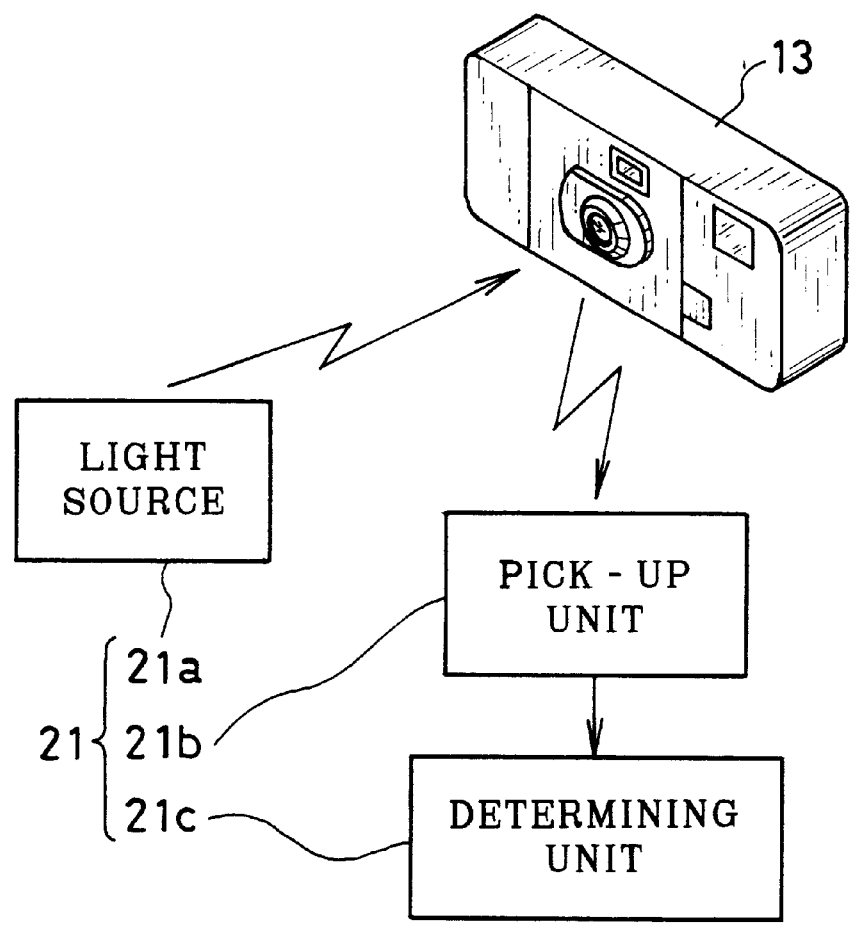
FIG. 2B is a block diagram illustrating an orientation discriminator in the orientation regularizer.

The orientation discriminator 21 includes a light source 21a. See FIG. 2B. The light source 21a applies inspecting light to the lens-fitted photo film unit 13 in one direction. A pick-up unit 21b of the orientation discriminator 21 picks up the inspecting light. A determining unit 21c is provided with a monitor display screen, which is caused to display an image being picked up. In FIGS. 3A–3D, windows W1–W4 are illustrated, and are predetermined in the determining unit 21c at particular regions in the frame of the monitor display screen. The number of white or black pixels is obtained, and compared with a reference value to recognize the orientation of the lens-fitted photo film unit 13. This is according to the window determining method. It is to be noted that, alternatively, a characteristic deriving method may be used, in which characteristic values are derived from the image of the lens-fitted photo film unit 13 being picked up, and compared with reference values. Also, a pattern matching method may be used, in which the image being picked up is superimposed with preset data in a memory.

Note that an additional conveyor belt (not shown) is incorporated in the orientation discriminator 21 for conveying the lens-fitted photo film unit 13. It is alternatively possible to design the conveyor belt 17 to extend to the exit position of the orientation discriminator 21 to convey the lens-fitted photo film unit 13 through the orientation discriminator 21. Furthermore, a downward inclined conveying path may be disposed inside the orientation discriminator 21 without using the conveyor. The lens-fitted photo film unit 13 may be passed through the orientation discriminator 21 by gravity from the conveyor belt 17 to the exit position of the orientation discriminator 21.

An example of the sorter 22 is disclosed in JP-A 8-282837, in which the sorter 22 is constituted by a conveyor 19, a pair of path changing plates, and plural paths. While the lens-fitted photo film unit 13 is moved between the path changing plates, the path changing plates are rotated according to the orientation information, so as to guide the lens-fitted photo film unit 13 to one of the paths associated with the detected orientation. The lens-fitted photo film unit 13, if in the front-forward/top-upward orientation, is guided to the first conveying path 26, and if in the rear-forward/top-upward orientation, is guided to the second conveying path 23, and if in the rear-forward/bottom-upward orientation, is guided to the third conveying path 24, and if in the front-forward/bottom-upward orientation, is guided to the fourth conveying path 25.

The four conveying paths 23–26 are arranged in parallel. The second conveying path 23 is provided with a front-to-rear turning unit 28, which turns the lens-fitted photo film unit 13 about an axis extending vertically, to replace its right side with its left side with reference to the conveying direction. Thus the rear-forward/top-upward orientation of the lens-fitted photo film unit 13 is regularly changed to the front-forward/top-upward orientation.

The third conveying path 24 is provided with a top-to-bottom turning unit 29, which turns the lens-fitted photo film unit 13 about an axis along the conveying direction, for its top side to be replaced with its bottom side and also for its right side to be replaced with its left side. Thus the rear-forward/bottom-upward orientation of the lens-fitted photo film unit 13 is regularly changed to the front-forward/top-upward orientation.

The fourth conveying path 25 is provided with the front-to-rear turning unit 28 and the top-to-bottom turning unit 29 disposed serially. The front-forward/bottom-upward orientation of the lens-fitted photo film unit 13 is changed to the front-forward/top-upward orientation by passage through the fourth conveying path 25. Note that the top-to-bottom turning unit 29 may be disposed upstream or downstream from the front-to-rear turning unit 28 along the fourth conveying path 25.

The first conveying path 26 is supplied with the lens-fitted photo film unit 13 in the front-forward/top-upward orientation. The lens-fitted photo film unit 13 is conveyed without changes in its orientation.

Figure 4:
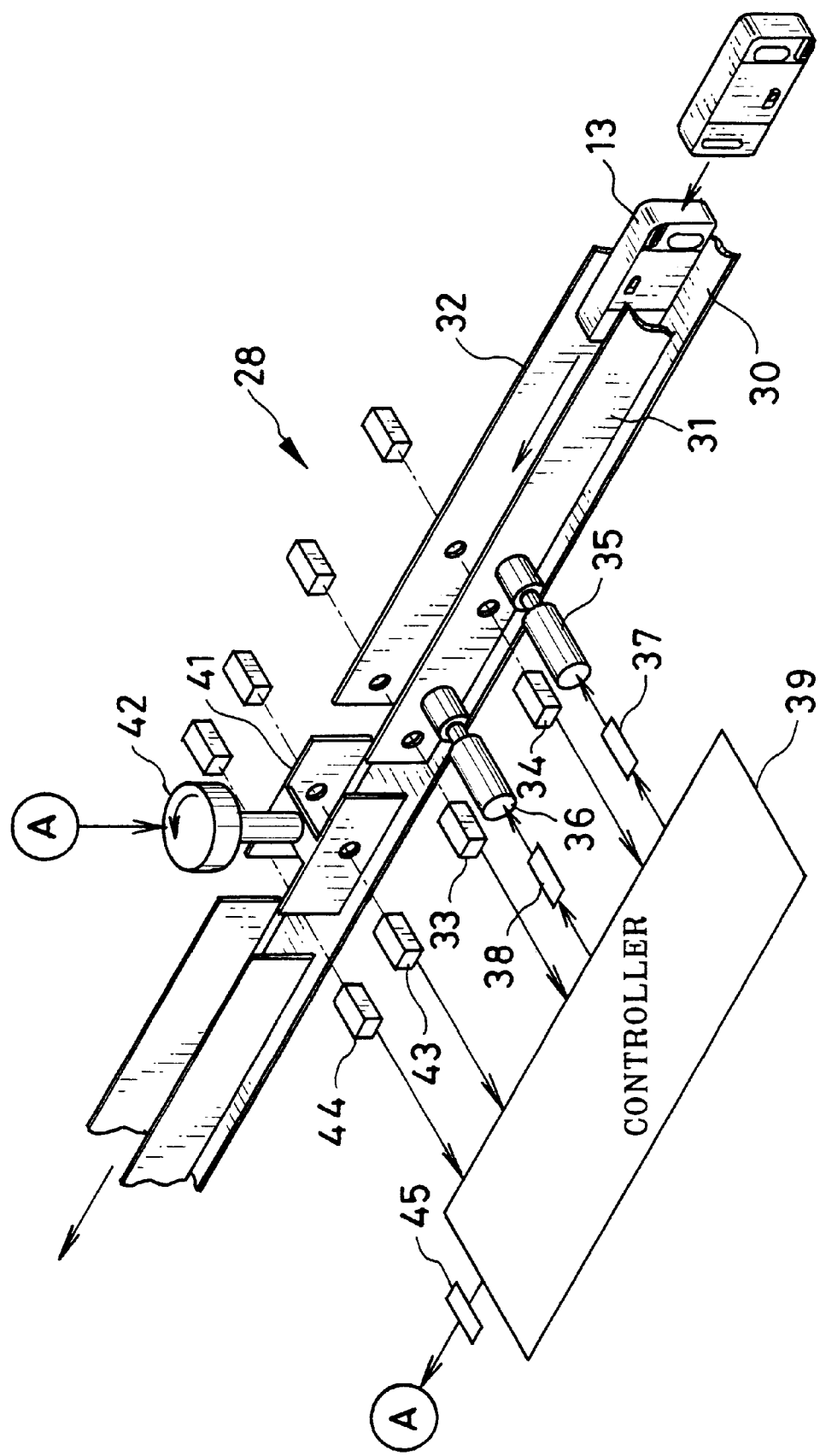
FIG. 4 is a perspective illustrating a front-to-rear turning unit.

In FIG. 4, the front-to-rear turning unit 28 is constituted by a conveyor 30, a rotary guiding mechanism, a one-body advancing mechanism and a controller. The conveyor 30 conveys the lens-fitted photo film units 13 in one line. Two guiding plates 31 and 32 are disposed on sides of the conveyor 30 in a stationary manner. The one-body advancing mechanism includes stoppers 35 and 36 and sensors 33 and 34, and is disposed upstream from the rotary guiding mechanism. The stoppers 35 and 36 are disposed at a predetermined distance in the conveying direction.

Each of the stoppers 35 and 36 is a combination including an actuator, a rod and a push member. Drivers 37 and 38 are controlled by a controller 39 to drive the actuators of the stoppers 35 and 36. The rod is caused by each actuator to move in a direction perpendicular to the conveying direction. The rod is movable between projecting and retracted positions, and when in the projecting position, causes the push member to project to the conveyor 30 through an opening in the guiding plate 31, and when in the retracted position, causes the push member to retreat from the conveyor 30. The push member is connected to an end of the rod by means of a spring. When the rod is in the projecting position, the push member resiliently presses the lens-fitted photo film unit 13 against the guiding plate 32, and keeps the lens-fitted photo film unit 13 retained on the guiding plate 32.

The sensors 33 and 34 are disposed close to respectively the stoppers 36 and 35, and detects presence and absence of the lens-fitted photo film unit 13 at the stoppers 36 and 35. A position sensor 43 is disposed in the rotary guiding mechanism. When passage of the lens-fitted photo film unit 13 is detected at the position sensor 43 and the sensor 33, then the controller 39 drives the actuator for the stopper 36, and causes the rod to move to the projecting position, so that the lens-fitted photo film unit 13 is blocked and kept from passing. Afterwards, passage of the lens-fitted photo film unit 13 is detected by the sensor 34 in the position of the stopper 35, then the controller 39 drives the actuator for the stopper 35, and causes the rod to move to the projecting position, so that succeeding lens-fitted photo film units 13 are blocked and kept from passing.

The rotary guiding mechanism is a combination including first and second opposed plates 41 and an actuator 42, is provided with the position sensor 43 and a sensor 44, and is located downstream from the stoppers 35 and 36 and positioned in a gap defined between portions of the guiding plates 31 and 32. The first and second opposed plates 41 are interconnected at a distance greater than a thickness of the lens-fitted photo film unit 13, and have a length greater than a length of the longest of the types of the lens-fitted photo film units 13 in the conveying direction. The position sensor 43 detects existence of the lens-fitted photo film unit 13 located between the first and second opposed plates 41. The sensor 44 detects existence of the lens-fitted photo film unit 13 after passage between the first and second opposed plates 41. The actuator 42 causes the first and second opposed plates 41 to make half a rotation about an axis which is vertical and passes through a center of the conveyor 30 in its width direction.

The controller 39 monitors an output of the position sensor 43. When the position sensor 43 detects passage of a first one of the lens-fitted photo film units 13 between the first and second opposed plates 41, a driver 45 is caused by the controller 39 to drive the actuator 42, which causes the first and second opposed plates 41 to make half a rotation to change a direction of the first lens-fitted photo film unit 13. The rotational movement of the first and second opposed plates 41 is effected at a sufficiently high speed, because the conveyor 30 keeps moving without intermittence. Again the first lens-fitted photo film unit 13 being turned is conveyed by the conveyor 30 in the conveying direction. When the first lens-fitted photo film unit 13 comes away from the first and second opposed plates 41, the sensor 44 generates a signal. In response to this, the controller 39 operates the actuator for the stopper 36. The lens-fitted photo film units 13 are supplied to the rotary guiding mechanism one after another. After this the controller 39 causes the rod of the stopper 35 to move back to the retracted position, to allow succeeding lens-fitted photo film units 13 to be conveyed toward the stopper 36.

Note that, in spite of the description above, the front-to-rear turning unit 28 may have a structure disclosed in JP-A 6-286853, in which a rotary member is disposed above the conveyor, projecting pins are caused to project upward from under the conveyor, and press the lens-fitted photo film unit 13 against the rotary member, and the rotary member rotates to change the direction of the lens-fitted photo film unit 13.

Furthermore, the front-to-rear turning unit 28 may include a robot hand which can grasp and rotate the lens-fitted photo film unit 13.

Figure 5:
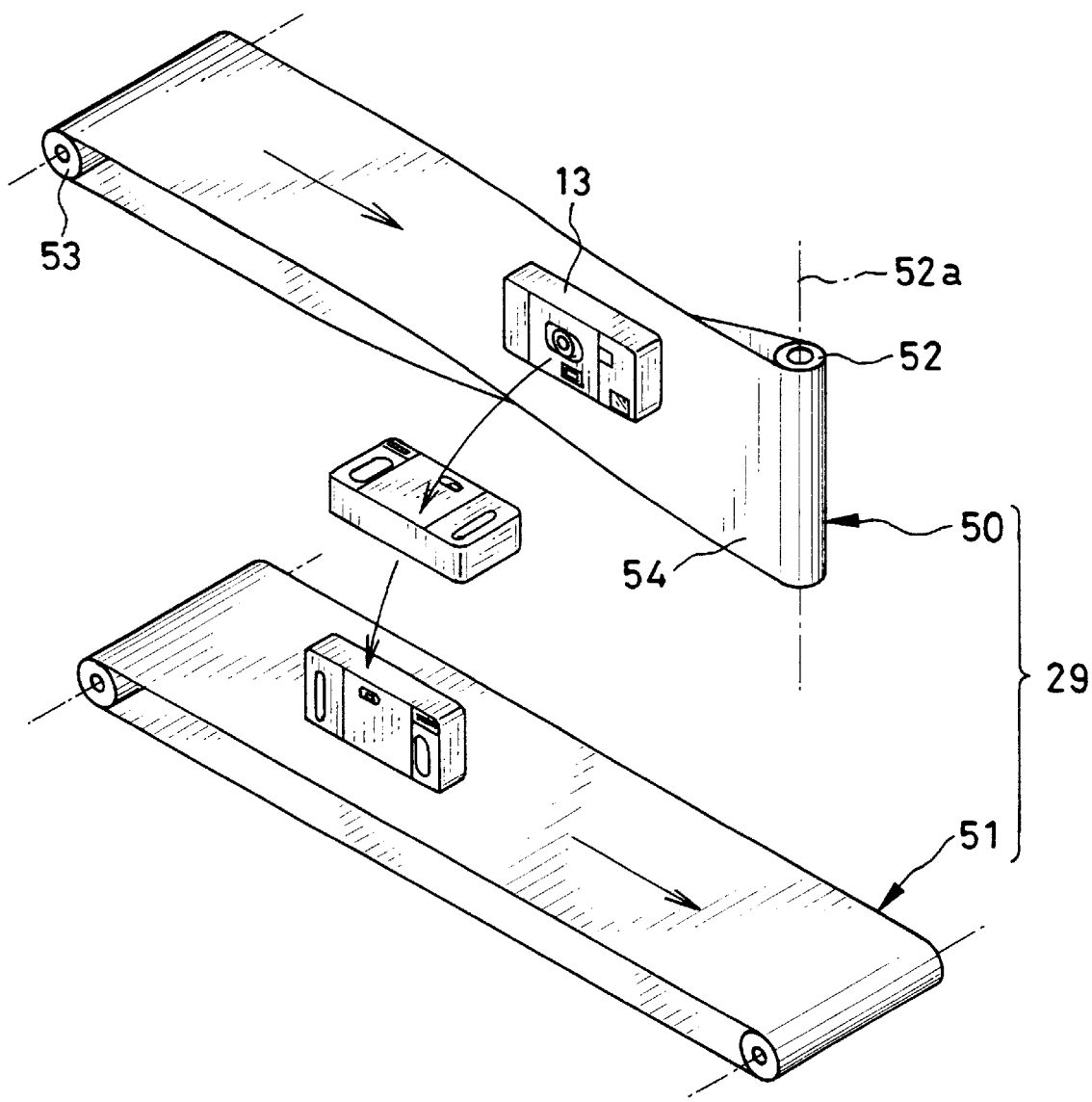
FIG. 5 is a perspective illustrating a top-to-bottom turning unit.

In FIG. 5, the top-to-bottom turning unit 29 consists of combination of a dropping section 50 constituted by a twisted conveyor belt 54, and a receiving flat conveyor belt 51 as a receiving section. The twisted conveyor belt 54 is supported and driven by a carrier roller 53 and a return roller 52. A roller shaft 52a of the return roller 52 extends in a direction vertical to that of the carrier roller 53. The twisted conveyor belt 54 is twisted between the return roller 52 and the carrier roller 53, and thrusts the lens-fitted photo film unit 13 in a direction perpendicular to the conveying direction in the course of conveyance. So the twisted conveyor belt 54 drops the lens-fitted photo film unit 13 toward the flat conveyor belt 51 in an orientation upside down. The flat conveyor belt 51 receives the lens-fitted photo film unit 13 in this orientation, and conveys further in the conveying direction.

Note that, in spite of the description above, the top-to-bottom turning unit 29 may have a structure disclosed in U.S. Pat. No. 5,427,224 (corresponding to JP-A 6-156688), in which air is applied to the lens-fitted photo film unit 13 to blow the same in the direction perpendicular to the conveying direction, so that the lens-fitted photo film unit 13 is dropped while shifted horizontally. Also, an impeller may be used, which can rotate to push the lens-fitted photo film unit 13 in the direction perpendicular to the conveying direction, so that the lens-fitted photo film unit 13 is dropped.

Figure 6:
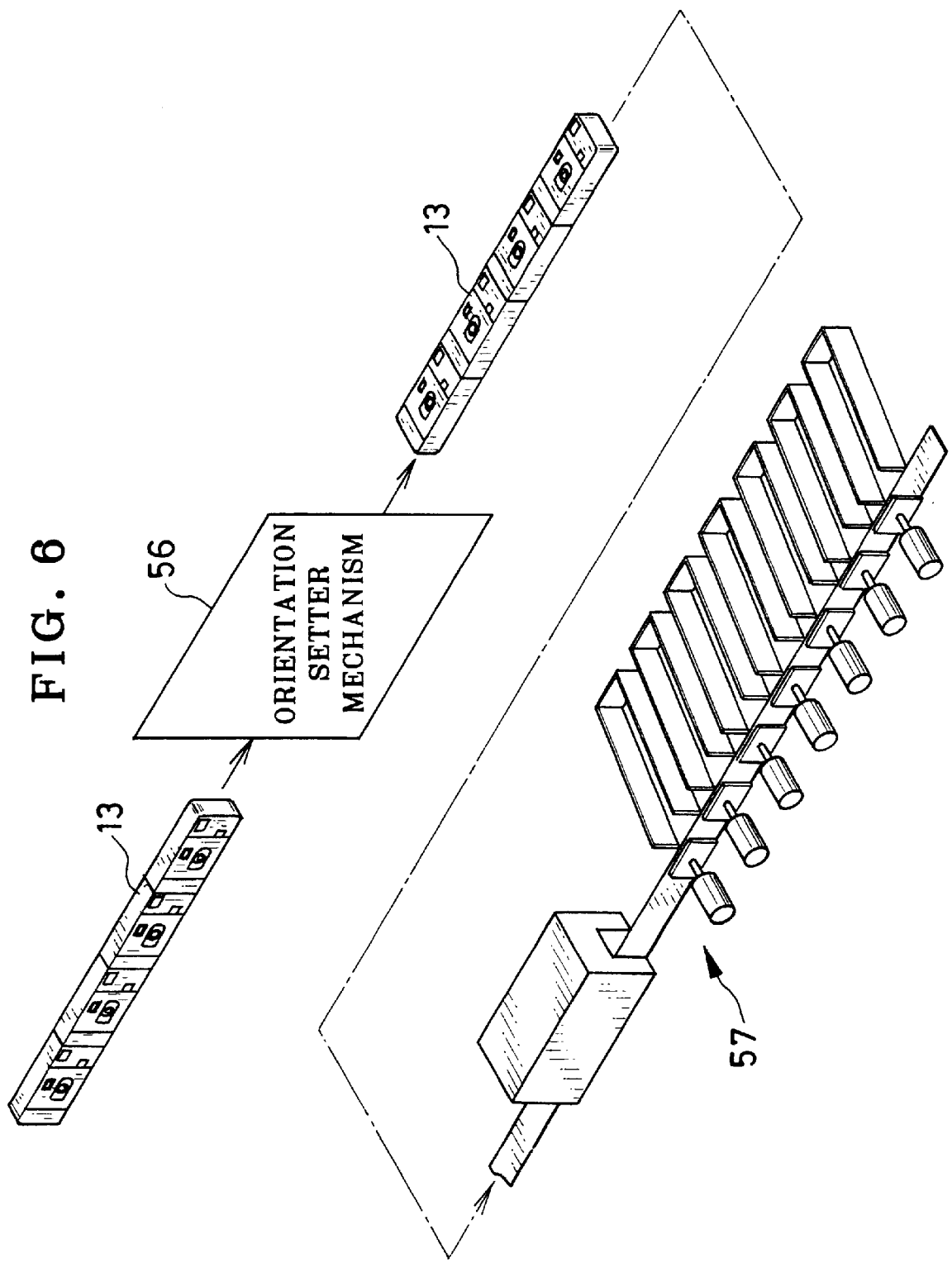
FIG. 6 is an explanatory view in perspective, illustrating an orientation setter mechanism and a sorter.

The aligning mechanism 27 is supplied with the lens-fitted photo film units 13 conveyed from the four conveying paths 23–26, and aligns those in one line without collision. The lens-fitted photo film units 13 are all regularized in the front-forward/top-upward orientation, and conveyed to an orientation setter mechanism 56. See FIG. 6. An example of the aligning mechanism 27 is disclosed in JP-A 9-169425. The aligning mechanism 27 includes three aligning units as disclosed in this document. Two of the four conveying paths 23–26 are unified by a first one of the aligning units. The remaining two of the four conveying paths 23–26 are unified by a second one of the aligning units. The two paths are obtained, but again are unified by the third one of the aligning units, to obtain a single path along which the lens-fitted photo film units 13 are aligned in one line. Each aligning unit includes two conveyors and two stoppers. One of the conveyors is disposed vertically above the other. Downstream sections of the conveyors are joined with one another. The stoppers are disposed before respectively the joined portions of the conveyors, and operate for stopping the lens-fitted photo film units 13 intermittently so as to prevent collision of the lens-fitted photo film units 13 at the joined portions. Note that it is possible not to use the stoppers, but to stop the conveyors intermittently for stopping the lens-fitted photo film units 13.

The lens-fitted photo film units 13, after movement in its longitudinal direction, is conveyed to the orientation setter mechanism 56 in the front-forward/top-upward orientation. The orientation setter mechanism 56 changes the orientation of the lens-fitted photo film units 13 to a horizontally laid orientation in which the front wall of the lens-fitted photo film units 13 is directed upwards, and transfers the lens-fitted photo film units 13 to a sorter 57. The lens-fitted photo film units 13 being not erect does not have a problem of likeliness of falling down. In the sorter 57, there does not occur a difficulty of stopping consecutive operation as no accident of falling down occurs.

Figure 7:
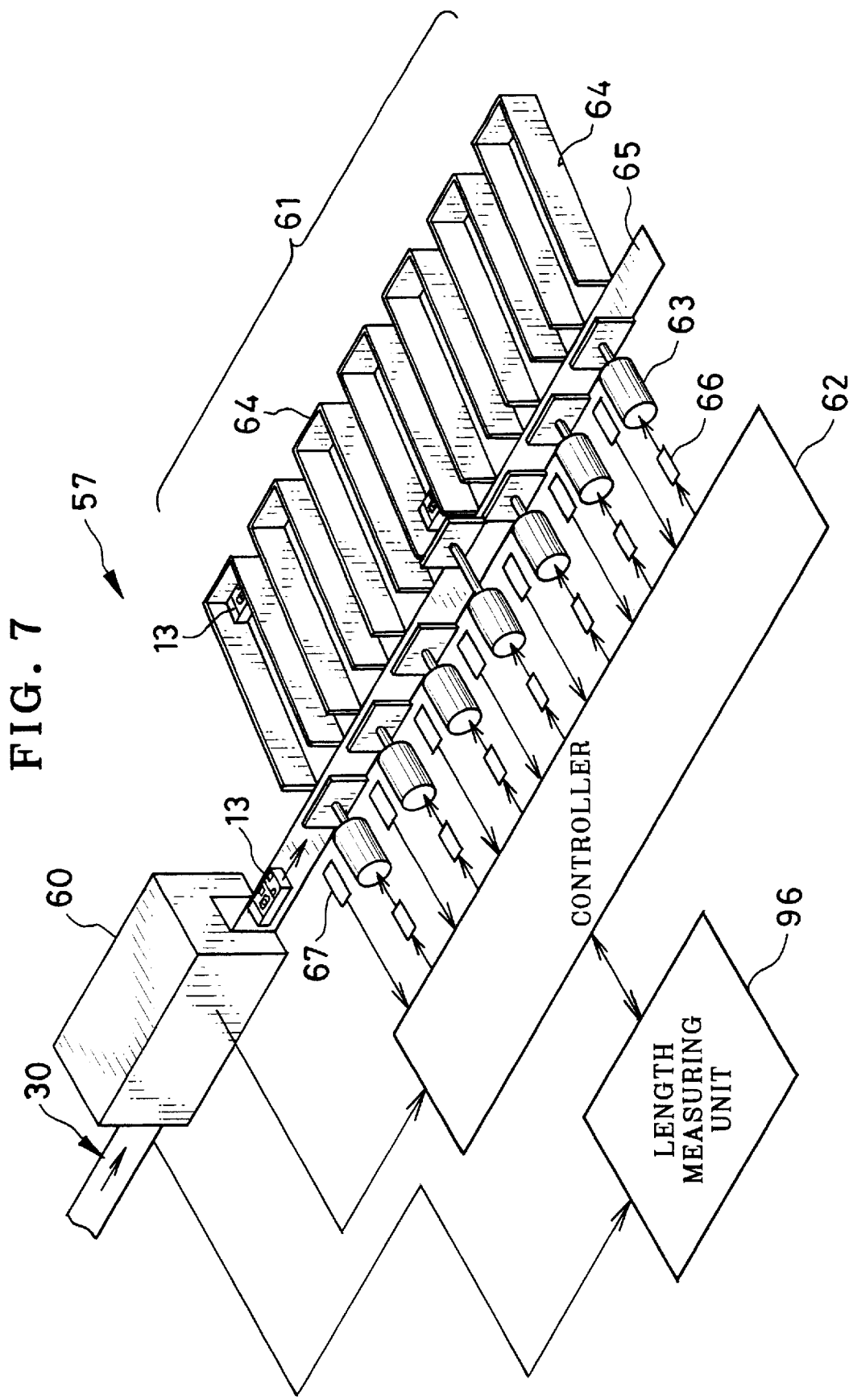
FIG. 7 is an explanatory view in perspective, illustrating the sorter.

In FIG. 7, the sorter 57 is constituted by a type discriminator 60 or image processor, a type selector 61 and a controller 62. The type discriminator 60 is supplied with the lens-fitted photo film units 13 one by one in the horizontally laid orientation by the above-described one-body advancing mechanism. The type discriminator 60 includes a light source and a pick-up unit. The light source applies inspecting light to the lens-fitted photo film unit 13 in one direction, for example in a downward direction to the surface of the lens-fitted photo film unit 13. The pick-up unit picks up the inspection light reflected by the lens-fitted photo film unit 13. A determining unit retrieves such characteristics from the image as a contour of the lens-fitted photo film unit 13, protruding and retracted patterns of the surface of the lens-fitted photo film unit 13. The determining unit operates according to the pattern matching method, and compares the retrieved characteristics with those of a reference images which are stored and predetermined for respective types, so as to recognize the type of the lens-fitted photo film unit 13. Information of the recognized type is sent to the controller 62. Note that the light source may be constructed according to a diffusion illuminating method, in which the light source includes plural units disposed about the pick-up unit for illuminating the lens-fitted photo film unit 13.

The type selector 61 is constituted by plural pushers 63 and plural ejecting paths 64, for example seven pushers and seven ejecting paths. A sorting conveying path 65 is defined by a conveyor. The pushers 63 are arranged in the conveying direction of the sorting conveying path 65. Each of the pushers 63 includes a solenoid, a cylinder, a motor or an actuator of any of other kinds, and pushes away the lens-fitted photo film unit 13 in a direction crosswise to the conveying direction. The ejecting paths 64 are disposed on a side opposite to the pushers 63 with reference to the sorting conveying path 65, are associated with respectively the pushers 63, and stock the lens-fitted photo film unit 13 by each type.

The controller 62 designates one of the ejecting paths 64 according to the type information. A length measuring unit 96 or a monitoring structure is operated to monitor a position of the lens-fitted photo film unit 13. Upon a reach of the lens-fitted photo film unit 13 at the designated one of the ejecting paths 64, a corresponding one of the pushers 63 is operated to push the lens-fitted photo film unit 13 into the designated one of the ejecting paths 64. In the ejecting paths 64, a plurality of the lens-fitted photo film units 13 are arranged in its width direction, and kept oriented in the horizontally laid orientation in which the taking lens is directed upwards. When a predetermined number of the lens-fitted photo film units 13 are contained in each of the ejecting paths 64, the lens-fitted photo film units 13 are transferred to a container while kept in the same orientation, and brought to recycling lines. Note that a driver 66 operates for driving each actuator of the pushers 63.

The length measuring unit 96 measures a conveyed distance of the conveyor to send the data. Alternatively, plural position detectors 67 or sensors may be disposed in respectively the ejecting paths 64 as monitoring structure for detecting passage of the ejecting paths 64. As the ejecting paths 64 and the pushers 63 are arranged in the conveying direction of the sorting conveying path 65, it is possible easily to increase the number of the ejecting paths 64 and the pushers 63 if the number of the types is increased.

In the present embodiment, the length measuring unit 96 is connected for measuring the conveyed distance at which the conveyor 30 conveys the lens-fitted photo film unit 13 along the sorting conveying path 65. An example of the length measuring unit 96 is a combination of a timer and an external input panel. The timer starts operation upon detection of the lens-fitted photo film unit 13 at the type discriminator 60. The external input panel is operated by an operator to input a conveying speed at which the conveyor 30 is driven along the sorting conveying path 65. The controller 62 effects multiplication of the input conveying speed by time measured by the timer to obtain the conveyed distance of the lens-fitted photo film unit 13 from the type discriminator 60. Upon coming up of the conveyed distance to a designated one of plural reference distances, a corresponding one of the pushers 63 is driven.

Note that, instead of the use of the timer, the length measuring unit 96 may have a rotary encoder and a counter. The rotary encoder may be associated with a motor or roller for the conveyor 30. The counter may count pulses generated by the rotary encoder to detect the conveyed distance of the lens-fitted photo film unit 13 after passing the type discriminator 60.

Figure 8:
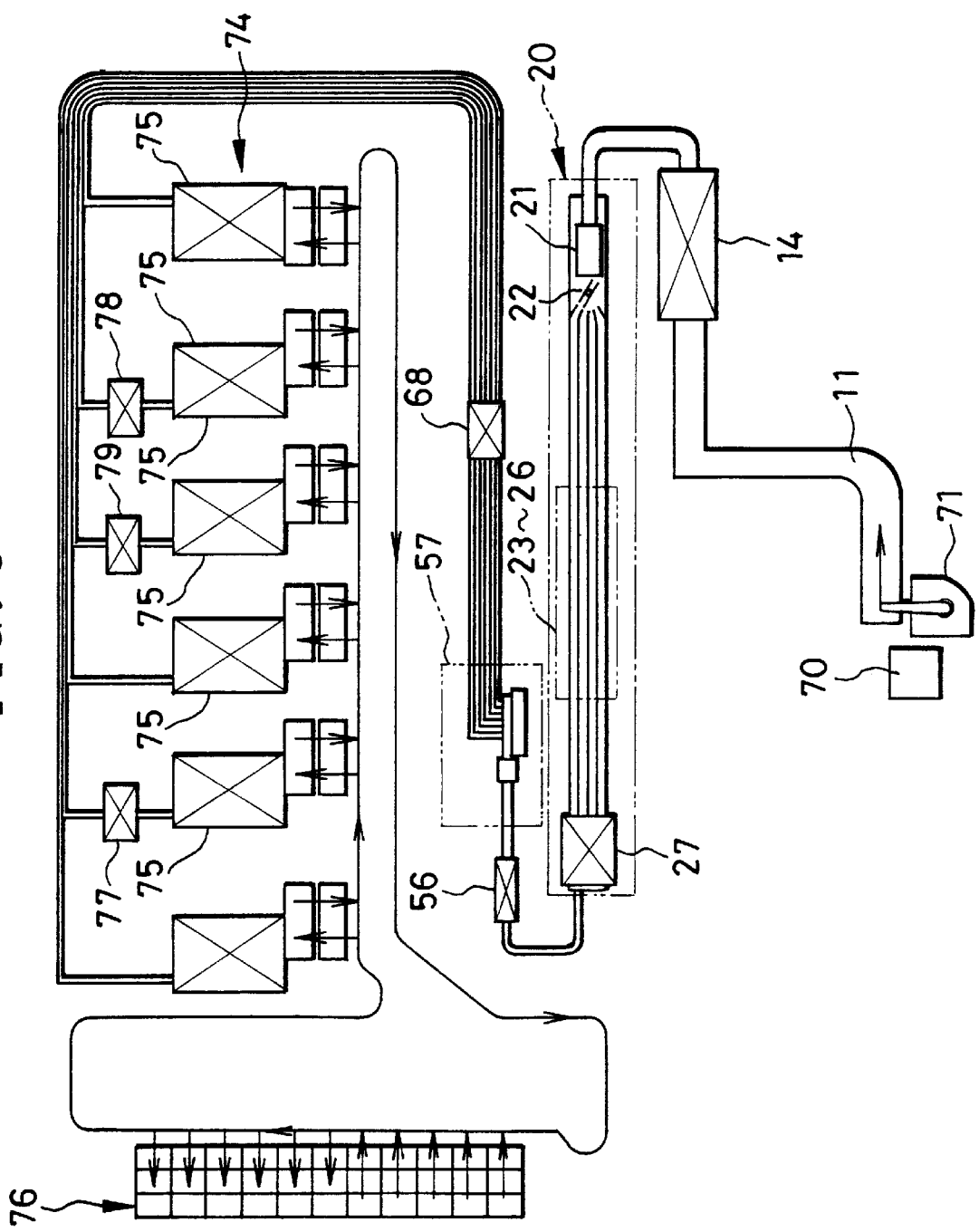
FIG. 8 is a schematic view illustrating various mechanisms of the sorting line.

In FIG. 8, the above-described mechanisms of the sorting line are depicted. The lens-fitted photo film units 13 being used are withdrawn in a state collectively contained in a container. Plural containers with the lens-fitted photo film units 13 are piled on one another in a piling pallet, and transferred into a supply station 70. A transferring unit 71 is disposed at the supply station 70, handles each one of the containers and turns the container upside down above the conveyor 11. The conveyor 11 is supplied with the lens-fitted photo film units 13 in random orientations.

The lens-fitted photo film units 13 are conveyed by the conveyor 11 to the aligning unit 14 which is linearly disposed at the supply station 70. The lens-fitted photo film units 13 are aligned by the V-shaped conveyor 15 in one line, and caused by the drum 16 to have an erect orientation. Thus the lens-fitted photo film units 13 come to be conveyed in its longitudinal direction and in only any one of the four orientations which are the front-forward/top-upward, front-forward/bottom-upward, rear-forward/top-upward, and rear-forward/bottom-upward orientations.

After passing the supply station 70 and the aligning unit 14, the lens-fitted photo film units 13 are passed through components of the orientation regularizer 20 including the orientation discriminator 21, the sorter 22, the four conveying paths 23–26 and the aligning mechanism 27. The orientation of the lens-fitted photo film units 13 is regularized in a predetermined orientation, which, according to the present embodiment, is the front-forward/top-upward orientation.

The orientation setter mechanism 56 and the type selector 61 are disposed in series with the orientation regularizer 20. The orientation setter mechanism 56 changes the orientation of the lens-fitted photo film units 13 to the horizontally laid orientation with its front directed upwards. Then the lens-fitted photo film units 13 are conveyed to the sorter 57 and sorted into the plural types. In the present embodiment, the conveyor is connected with any of the ejecting paths 64 for the predetermined types of the lens-fitted photo film units 13 which are to be conveyed to an orientation setter mechanism 68. Again the orientation setter mechanism 68 changes the orientation of the lens-fitted photo film units 13 to an erect orientation, for example the front-forward/bottom-upward orientation for the purpose of efficient containing into a container. Then the lens-fitted photo film units 13 are conveyed to an exit station array 74.

There are several reasons for using the front-forward/bottom-upward orientation. After the sorting, the lens-fitted photo film units 13 of only one type are contained in only one orientation. There occurs no jamming of the lens-fitted photo film units 13 along the guiding plates if the lens-fitted photo film units 13 are buffered when conveyed. If in contrast the lens-fitted photo film units 13 are horizontally laid, some of the lens-fitted photo film units 13 are likely to be thrust upwards by line pressure in the course of buffering. An upper guiding cover plate may be added to the conveyor, but results in low operability in the apparatus. Furthermore, the use of the front-forward/bottom-upward orientation is effective in avoiding difficulties in conveyance of the lens-fitted photo film units 13 of which a bottom lid for the cassette removal is open.

An exit stations 75 are arranged in the exit station array 74 in series with the orientation setter mechanism 56 and the type selector 61. Each of the exit stations 75 includes a transferring mechanism for placing the lens-fitted photo film unit 13 into an empty container after the type sorting. The exit stations 75 are provided with containers by unmanned transferring cars, and receives insertion of the lens-fitted photo film units 13. The containers are fetched by the unmanned transferring cars, and conveyed to a storage 76. The containers with the lens-fitted photo film units 13 are transferred from the storage 76 to recycling lines associated with respectively the types of the lens-fitted photo film units 13. It is to be noted that some of the lens-fitted photo film units 13 are still in a condition covered by an outer casing or sticker made of sheets of paper or cardboard. The lens-fitted photo film units 13 in this condition are introduced to sticker peelers 77 and 78 or an outer casing eliminator 79 disposed before the exit stations 75. The sticker peelers 77 and 78 or the outer casing eliminator 79 removes the outer casing or sticker from the lens-fitted photo film unit 13, which are then transferred to the exit stations 75.

The lens-fitted photo film unit 13 has a well-known construction including a main body, an exposure unit, a front cover and a rear cover. The main body includes a cassette holder chamber and a photo film holder chamber. The exposure unit has a flash charger switch, a flash unit, a dry battery, a taking lens and a shutter unit. The front cover and the rear cover are disposed in front of and behind the combination of the main body and the exposure unit.

Figure 9:
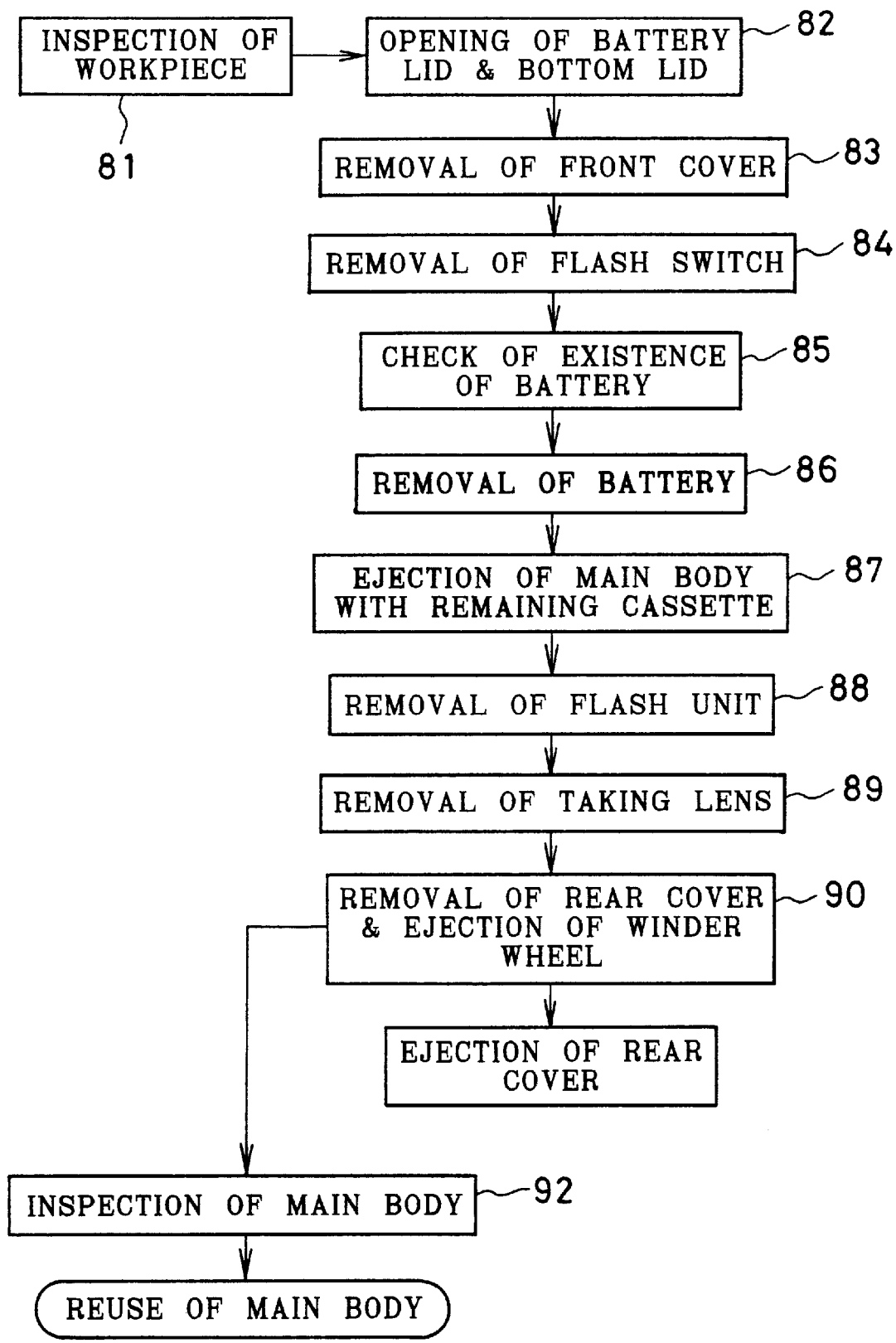
FIG. 9 is a flow chart illustrating operation of a recycling line.
Figure 10:
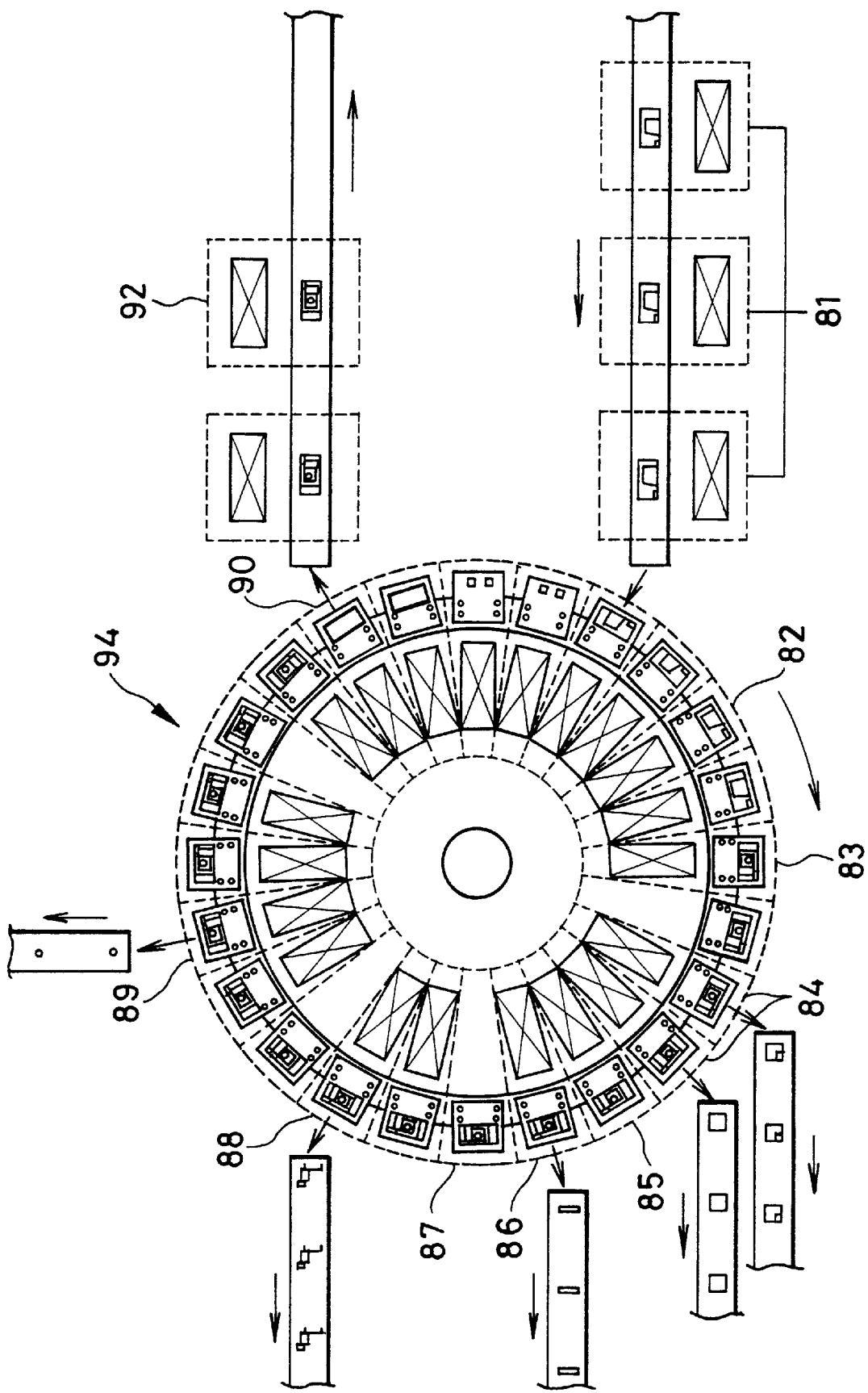
FIG. 10 is an explanatory view in plan, illustrating the recycling line.

As illustrated in FIGS. 9 and 10, the recycling line is constituted by a work inspector 81, an opener 82 for the battery lid and the bottom lid, a front cover remover 83, a flash switch remover 84, a battery existence checker 85, a battery remover 86, a cassette-remaining main body ejector 87, a flash unit remover 88, a taking lens remover 89 and a remover 90 for the rear cover and the winder wheel.

The work inspector 81 picks up the lens-fitted photo film unit 13 being conveyed, and inspects external scratches or damages, errors in the type and errors in the conveying direction as errors concerning the outer shape, by means of image processing. Then the height of the lens-fitted photo film unit 13 is measured by use of a photoelectric sensor. According to an output from the sensor, it is checked as to whether the front cover is loose and positioned farther from the main body than an acceptable front cover. If the lens-fitted photo film unit 13 has no looseness in the position of the front cover, the lens-fitted photo film unit 13 is transferred to the following stations. This is effective in avoiding difficulties in the following stations for the recycling.

Then the lens-fitted photo film unit 13 is transferred to an indexing table 94, which intermittently rotates to subject the lens-fitted photo film unit 13 sequentially to the opener 82, the front cover remover 83, the flash switch remover 84, the battery existence checker 85, the battery remover 86, the cassette-remaining main body ejector 87, the flash unit remover 88, the taking lens remover 89 and the remover 90. Then the main body is obtained with the exposure unit remaining thereon without the taking lens. The main body is transferred from the recycling line to a main body inspector 92, where the main body is inspected before being reused.

In the above embodiment, the lens-fitted photo film units 13 in the sorter 22 are conveyed in any of the above-described four erect orientations. However the lens-fitted photo film units 13 in the sorter 22 may be conveyed in any of four horizontally laid orientations in which the front or rear wall is directed upwards.

In the above embodiment, the lens-fitted photo film units 13 in the sorter 57 are conveyed in the horizontally laid orientation in which the front wall is directed upwards. However the lens-fitted photo film units 13 in the sorter 57 may be conveyed in any predetermined one of the above-described four erect orientations.

Furthermore, the lens-fitted photo film units 13 in the sorter 22 or in the sorting conveying path 65 may be conveyed in a direction perpendicular to the longitudinal direction of the lens-fitted photo film units 13. The lens-fitted photo film units 13 in the sorter 22 may be conveyed in any of four erect orientations in which the front or rear wall is advanced in the conveying direction. The lens-fitted photo film units 13 in the sorting conveying path 65 may be conveyed in any predetermined one of the four erect orientations, or in any predetermined one of four horizontally laid orientations in which the top or bottom wall is advanced in the conveying direction.

In the above sorter 57, the sorting conveying path 65 is straight. However a conveyor for a sorter may be a turntable. A sorting conveying path may be circular or arc-shaped. Plural pushers and plural ejecting paths may be disposed to extend in radial directions.

In the above embodiment, the lens-fitted photo film units 13 are used articles. However the orientation regulating apparatus and the sorting apparatus in the present invention can be used for unused lens-fitted photo film units, and also for box-shaped articles of any kinds.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An orientation regularizing apparatus for a lens-fitted photo film unit having front, rear, top and bottom surfaces, said orientation regularizing apparatus comprising:
    a supplier for conveying said lens-fitted photo film unit aligned in one line, said lens-fitted photo film unit having one of first, second, third and fourth orientations while being conveyed, said second orientation having said front and rear surfaces exchanged with one another with reference to said first orientation, said third orientation having said front and rear surfaces exchanged with one another and said top and bottom surfaces exchanged with one another with reference to said first orientation, and said fourth orientation having said top and bottom surfaces exchanged with one another with reference to said first orientation;
    an orientation discriminator operative to discriminate a present orientation for said lens-fitted photo film unit being conveyed from among said first to fourth orientations;
    an orientation sorter, operative to sort said lens-fitted photo film unit according to said present orientation discriminated by said orientation discriminator;
    first, second, third and fourth conveying paths, connected with said orientation sorter, for conveying said lens-fitted photo film unit sorted by said orientation sorter along one of said paths, wherein said first to fourth orientations respectively correspond to said first to fourth conveying paths;
    a first front-to-rear turning unit, disposed in said second conveying path, for turning over said lens-fitted photo film unit to exchange said front and rear surfaces with one another, so as to set said lens-fitted photo film unit regularly in said first orientation;
    a first top-to-bottom turning unit, disposed in said third conveying path, for turning over said lens-fitted photo film unit to exchange said top and bottom surfaces with one another and to exchange said front and rear surfaces with one another, so as to set said lens-fitted photo film unit regularly in said first orientation;
    a second front-to-rear turning unit, disposed in said fourth conveying path, for turning over said lens-fitted photo film unit to exchange said front and rear surfaces with one another; and
    a second top-to-bottom turning unit, disposed in said fourth conveying path, for turning over said lens-fitted photo film unit to exchange said top and bottom surfaces with one another and to exchange said front and rear surfaces with one another, so as to set said lens-fitted photo film unit regularly in said first orientation.

2. An orientation regularizing apparatus as defined in claim 1, further comprising a type sorting device for sorting said lens-fitted photo film unit received from said first to fourth conveying paths, said sorting being based on at least one of a type or size.

3. An orientation regularizing apparatus as defined in claim 1, wherein said supplier aligns said lens-fitted photo film unit in a longitudinal direction thereof.

4. An orientation regularizing apparatus as defined in claim 3, further comprising an aligning mechanism for aligning said lens-fitted photo film unit exiting from one of said first to fourth conveying paths in one line while maintaining said first orientation.

5. An orientation regularizing apparatus as defined in claim 4, wherein said orientation regularizing apparatus supplies a disassembly line with said lens-fitted photo film unit set in said first orientation and aligned in one line.

6. An orientation regularizing apparatus as defined in claim 5, wherein when said lens-fitted photo film unit is in one of said first and second orientations, said top surface is directed upwards.

7. An orientation regularizing apparatus as defined in claim 5, wherein said orientation discriminator includes:
    a light source for applying illuminating light to said lens-fitted photo film unit;

a pick-up unit for picking up an image of said lens-fitted photo film unit illuminated by said illuminating light;

a determining unit for determining one of said first to fourth orientations in accordance with said image.

8. An orientation regularizing apparatus as defined in claim 5, wherein said first or second front-to-rear turning unit includes:

a rotary guiding mechanism, disposed in at least one of said second and said fourth conveying paths and rotatable about a vertically extending rotational axis, said rotary guiding mechanism having first and second opposed portions, said first and second opposed portions being arranged horizontally and opposed to one another for receiving said lens-fitted photo film unit therebetween by conveyance;

a position sensor for detecting said lens-fitted photo film unit and outputting a signal when said lens-fitted photo film unit reaches said rotary guiding mechanism by conveyance; and a controller, responsive to said signal from said position sensor, for causing said rotary guiding mechanism to make half a rotation.

9. An orientation regularizing apparatus as defined in claim 8, further comprising:

a conveyor for conveying said lens-fitted photo film unit along either said second or fourth conveying path;

a stopper, disposed in either said second or fourth conveying path upstream from said rotary guiding mechanism, for blocking said lens-fitted photo film unit in the respective said second or fourth conveying path;

wherein said controller operates in turning and conveying steps alternately, and when in said turning step, causes said stopper to block lens-fitted photo film units succeeding to a first one of plural lens-fitted photo film units arranged in said conveying direction, and causes said rotary guiding mechanism to turn said first lens-fitted photo film unit, and when in a subsequent said conveying step, causes said conveyor to convey said first lens-fitted photo film unit out of said rotary guiding mechanism, and shifts said stopper out of said second or fourth conveying path to supply said rotary guiding mechanism with one of said lens-fitted photo film units following said first lens-fitted photo film unit.

10. An orientation regularizing apparatus as defined in claim 5, wherein said first or second top-to-bottom turning unit includes:

a dropping section for dropping said lens-fitted photo film unit from a predetermined position by moving said lens-fitted photo film unit in a direction crosswise to said conveying direction during conveyance; and a receiving section, disposed under said predetermined position, for receiving said lens-fitted photo film unit dropped and oriented upside down.

11. An orientation regularizing apparatus as defined in claim 10, wherein said dropping section includes:

a carrier roller disposed upstream from said predetermined position and oriented substantially horizontally;

a return roller disposed downstream from said predetermined position and oriented erectly with reference to said carrier roller; and a twisted conveyor belt supported and driven by at least one of said carrier roller and said return roller and twisted with reference to said conveying direction.

12. A type sorting apparatus for a lens-fitted photo film unit, comprising:

a type discriminator for detecting a type of said lens-fitted photo film unit and outputting corresponding type information;

a conveyor for serially conveying said lens-fitted photo film unit from said type discriminator along a sorting conveying path;

a position detector for detecting a position of said lens-fitted photo film unit along said sorting conveying path and outputting position information;

ejecting paths, arranged on one side of said sorting conveying path and extended crosswise to said sorting conveying path, each of said ejecting paths being associated with a respective predetermined type of said lens-fitted photo film unit;

pushers, disposed on an opposite side of said sorting conveying path with respect to said ejecting paths, and movable toward respective ones of said ejecting paths, each one of said pushers corresponding to one of said ejecting paths; and a controller, responsive to said type information and said position information, for controlling said pushers, said controller designating one of said pushers in accordance with said detected type, and driving said designated pusher when said lens-fitted photo film unit moves to a position of said designated pusher, so as to push said lens-fitted photo film unit from said sorting conveying path to one of said ejecting paths corresponding to said designated pusher.

13. A sorting apparatus as defined in claim 12, wherein said conveyor conveys said lens-fitted photo film unit in a longitudinal direction thereof along said sorting conveying path.

14. A sorting apparatus as defined in claim 13, further comprising an orientation regularizer, disposed upstream from said type discriminator, for orienting said lens-fitted photo film unit with a taking lens thereof directed upwards.

15. A sorting apparatus as defined in claim 14, wherein said type discriminator includes:

a light source for applying illuminating light to said lens-fitted photo film unit;

a pick-up unit for picking up an image of said lens-fitted photo film unit illuminated by said illuminating light;

wherein said controller determines one of said types in accordance with said image.

16. A sorting apparatus as defined in claim 15, wherein said ejecting paths supply a disassembly line with said lens-fitted photo film unit pushed through said ejecting paths.

17. A sorting apparatus as defined in claim 16, wherein said position detector includes sensors, disposed along said sorting conveying path in association with respective ones of said pushers, for detecting said lens-fitted photo film unit.

18. A sorting apparatus as defined in claim 16, wherein said position detector includes a length measuring unit for measuring a conveyed distance said conveyor conveys said lens-fitted photo film unit;

and wherein said controller stores reference distances each predetermined for respective ones of said pushers along said sorting conveying path, so that when said conveyed distance approaches a particular one of said reference distances, said controller detects that said lens-fitted photo film unit is located in said position of said designated pusher.

19. An orientation regularizing method for a lens-fitted photo film unit having front, rear, top and bottom surfaces, said orientation regularizing method comprising:

supplying said lens-fitted photo film unit aligned in one line, said lens-fitted photo film unit having one of first, second, third and fourth orientations while conveyed, said second orientation having said front and rear surfaces exchanged with one another with reference to said first orientation, said third orientation having said front and rear surfaces exchanged with one another and said top and bottom surfaces exchanged with one another with reference to said first orientation, and said fourth orientation having said top and bottom surfaces exchanged with one another with reference to said first orientation;

discriminating a preliminary orientation for said lens-fitted photo film unit from among said first to fourth orientations;

guiding said lens-fitted photo film unit to one of first, second, third and fourth conveying paths when said preliminary orientation is, respectively, one of said first to fourth orientations;

in said second conveying path, turning over said lens-fitted photo film unit to exchange said front and rear surfaces with one another, so as to set said lens-fitted photo film unit regularly in said first orientation;

in said third conveying path, turning over said lens-fitted photo film unit to exchange said top and bottom surfaces with one another and to exchange said front and rear surfaces with one another, so as to set said lens-fitted photo film unit regularly in said first orientation; and in said fourth conveying path, turning over said lens-fitted photo film unit to exchange said top and bottom surfaces with one another, so as to set said lens-fitted photo film unit regularly in said first orientation.

20. An orientation regularizing method as defined in claim 19, further comprising aligning said lens-fitted photo film unit, being conveyed from one of said first to fourth conveying paths, in one line.

21. A sorting method for a lens-fitted photo film unit, comprising:

serially conveying said lens-fitted photo film unit along a sorting conveying path in a predetermined, regularized, orientation;

detecting a position of said lens-fitted photo film unit along said sorting conveying path;

detecting a type of said lens-fitted photo film unit;

designating one of a plurality of ejecting paths in accordance with said detected type, said ejecting paths being arranged on one side of said sorting conveying path and extended crosswise to said sorting conveying path; and when said lens-fitted photo film unit moves to a position of said one ejecting path, pushing said lens-fitted photo film unit from said sorting conveying path to said one ejecting path.

* * * * *